United States Patent [19]

Franklin et al.

[11] Patent Number: 4,656,433

[45] Date of Patent: Apr. 7, 1987

[54] LASER AMPLIFIER BUFFER

[75] Inventors: James D. Franklin, Los Angeles; Donald R. Dewhirst, Torrance, both of Calif.

[73] Assignee: Hughes Aircraft Company, Los Angeles, Calif.

[21] Appl. No.: 409,477

[22] Filed: Aug. 19, 1982

[51] Int. Cl.$^4$ ............................ H01S 3/11; H01S 3/00
[52] U.S. Cl. ..................................... 330/4.3; 372/12; 372/27; 350/401; 350/405
[58] Field of Search .................... 332/7.51; 372/12, 27, 372/106; 370/2; 356/117; 350/405, 406, 401, 402; 330/4.3

[56] References Cited

U.S. PATENT DOCUMENTS

| | | | |
|---|---|---|---|
| 3,701,956 | 10/1972 | Simmons | 372/12 |
| 3,868,168 | 2/1975 | DeVeer | 350/402 |
| 3,959,740 | 5/1976 | Dewhirst | 372/12 |
| 3,965,439 | 6/1976 | Firester | 372/12 |
| 4,198,123 | 4/1980 | Kremer | 350/401 |
| 4,305,046 | 12/1981 | Flock et al. | 372/27 |
| 4,331,387 | 5/1982 | Wentz | 372/12 |

OTHER PUBLICATIONS

J. Richards, "Unpolarized Electro-Optically Q-Switched Laser", 8/81, pp. 1-10, RPT. No. ERL-02-13-TR, Austria; abstract and equivalent U.S. applied optics article supplied herewith.
Bespalov et al, "Single-Crystal, . . . Radiation", 12/71, pp. 739-741, Optical Tech., vol. 38, #2.

*Primary Examiner*—Nelson Moskowitz
*Attorney, Agent, or Firm*—Lewis B. Sternfels; A. W. Karambelas

[57] ABSTRACT

A laser amplifier buffer arrangement for selectively switching laser energy in a double pass laser amplifier. The buffer arrangement comprises a wedge of birefringent material which angularly separates incident laser energy into polarized components, and an electro-optic polarization switch which may be selectively controlled to circularly polarize the polarization components of light passing therethrough. A plane mirror is employed to reflect the polarized components back through the switch and wedge. The wedge and switch are aligned in a manner such that an arbitrarily polarized input beam is separated into two orthogonally polarizated components that traverse separate paths through the buffer. The polarized components are reflected back through the switch and wedge by the mirror which is aligned with the normal bisecting the polarization component separation angle. When the switch voltage is off, both polarization components are misaligned with the incident beam energy when transmitted by the buffer, therefore preventing the laser amplifier from superradiant lasing. With the switch voltage on, the polarizations of both polarized components are rotated by 90° in the double pass through the switch, therefore re-entering the wedge with opposite polarizations. Also, both polarized beams will exit the wedge parallel to the incident beam, thus permitting laser amplifier operation. A second embodiment is also disclosed which further incorporates a second birefringent wedge and 90° rotator in conjunction with the first wedge in order to produce a wider beam deflection angle and straighten the beam path. The buffer may also be employed as a Q-switch in a laser oscillator to produce an unpolarized output beam.

1 Claim, 6 Drawing Figures

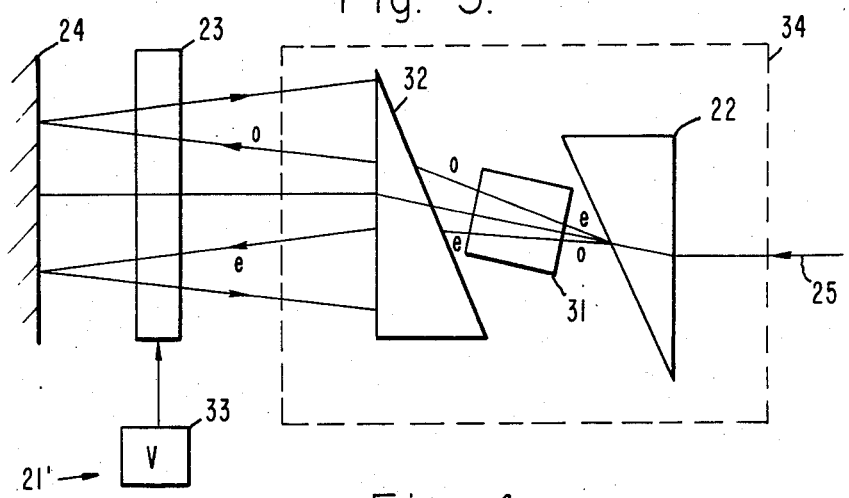
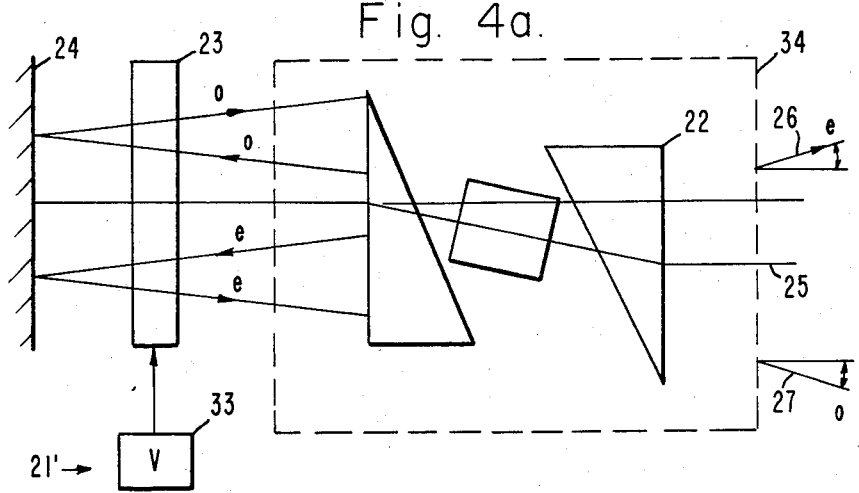
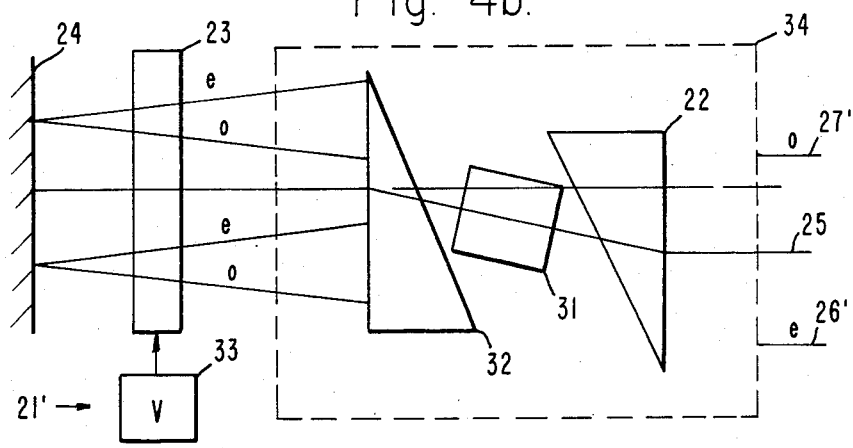

LASER AMPLIFIER BUFFER

BACKGROUND OF THE INVENTION

The present invention relates generally to laser amplifier buffers and more particularly to laser amplifier buffers which may be employed in double-pass amplifier chains which transmit laser energy having two polarization components. Also, the present invention relates to electro-optic Q-switches for laser oscillators.

In high-gain laser amplifier systems which employ a plurality of laser amplifiers, a buffer is necessary between amplifiers to prevent superradiant lasing. Previous buffer arrangements generally employ an electro-optic switch which is sandwiched between polarizers on either side. However, these devices operate in a manner which passes only one polarization. Therefore, these arrangements are limited to use with single-pass laser amplifier chains.

Double-pass amplifiers offer improved energy extraction from two passes through the amplifier chain. However, the double-pass amplifier requires that a buffer arrangement be present adjacent to the totally reflecting mirror of the laser amplifier which must transmit both polarizations. Therefore, the above-mentioned conventional amplifier buffers may not be employed in double-pass systems.

Electro-optic switches, or Q-switches are employed in laser oscillators to provide a technique which keeps the gain of the oscillator low while the population inversion is being increased, and switches the gain to a high value when the population inversion is maximum. This technique creates a single pulse at high peak power. Electro-optic switching action may be achieved with Kerr cells, or a Pockels cell, or the like. However, no electro-optic Q-switching device has been employed in a laser oscillator which switches the gain high for both polarization components to produce an unpolarized laser output.

SUMMARY OF THE INVENTION

It is therefore a feature of the present invention to provide a laser amplifier buffer which can angularly switch laser energy of any arbitrary polarization and which may be employed in double-pass laser amplifier systems.

It is also a feature of the present invention to provide a laser Q-switching device which angularly switches both polarization components of the laser energy in order to produce an unpolarized laser output beam.

A laser amplifier buffer in accordance with the present invention comprises a wedge of birefringent material disposed along an optical path for receiving laser energy which is parallel to the amplifier optical axis having arbitrary polarization and transmitting two components separated angularly and having orthogonal linear polarization states. An electro-optic polarization switch is disposed along the optical path for selectively rotating the polarization of both components passing therethrough by 90° during a double pass. Linearly polarized energy of each component is converted to circularly polarized energy in the first pass and back to linearly polarized energy rotated by 90° in the second pass. A plane mirror is employed to reflect the laser energy transmitted by the switch back through the switch.

The buffer arrangement receives laser energy of arbitrary polarization and transmits polarized energy having two orthogonal polarizations. The polarized components are transmitted along two separate paths which angularly deviate by a predetermined angle at the buffer exit when the switch is turned off. The polarized components are transmitted along two separate paths which are substantially parallel at the buffer exit when the switch is turned on. Hence, the input energy beam is re-formed at the buffer exit with 90° polarization rotation after the double-pass through the buffer arrangement with the switch turned on.

The laser amplifier buffer may be employed at the totally reflecting mirror of a double-pass amplifier chain in order to prevent superradiant lasing. When the buffer is turned off (voltage off), the two components of polarization are reflected back along the amplifier both angularly misaligned with the incoming energy. This prevents superradiant lasing action in the amplifier chain. When the buffer is turned on (voltage applied), the polarization components are reflected back into the amplifier parallel to each other, hence forming a collimated beam in the amplifier when a collimated beam is applied to the buffer.

In addition, the amplifier buffer may be employed as a Q-switch in an oscillator to obtain an unpolarized output beam. When used in an oscillator, the buffer prevents lasing when the switch is off and allows lasing of both polarizations when it is on. Oscillation is prevented because both polarization components are misaligned with respect to the end mirrors of the oscillator. With the switch on, the two end mirrors, are aligned for both polarization components, thus allowing laser oscillation of both polarizations.

A more complex version of the laser amplifier buffer may additionally employ a second birefringent wedge and 90° rotator in addition to the first birefringent wedge, formed in a sandwiched configuration. This configuration is used to geometrically straighten the laser beam path and provide a wider beam deflection angle.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 shows a second embodiment of a laser amplifier buffer in accordance with the principles of the present invention; and FIGS. 4a and b show the operation of the laser amplifier buffer of FIG. 3.

DETAILED DESCRIPTION OF THE INVENTION

Figure 1:
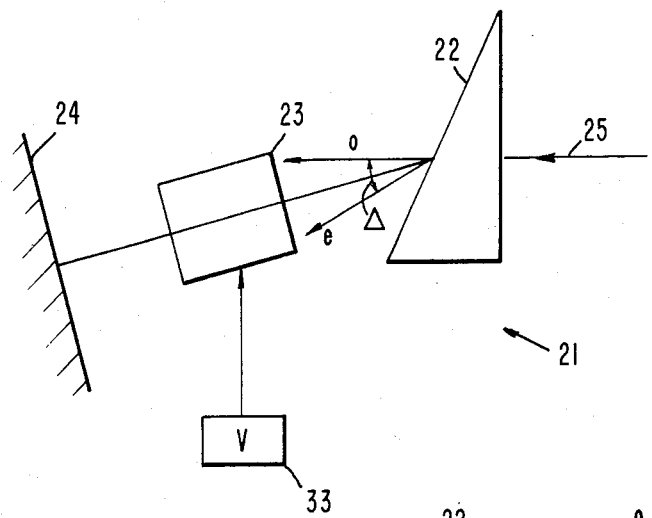
FIG. 1 illustrates a first embodiment of a laser amplifier buffer in accordance with the principles of the present invention.

Referring to FIG. 1, a first embodiment of a laser amplifier buffer 21 in accordance with the present invention is shown. The buffer 21 comprises a wedge 22 of birefringent material and an electro-optic polarization switch 23. The wedge 22 has its optic axis parallel to the wedge apex. The voltage induced fast and slow axes of the switch 23 are inclined 45° to the wedge apex.

The wedge 22 and switch 23 are disposed along an optical path of a laser oscillator or laser amplifier chain, or the like, so that an incident laser beam 25 comprising laser light of arbitrary polarization is transmitted through both components. In addition, a plane mirror 24 is disposed adjacent to the switch 23 opposite the wedge 22. The mirror 24 is the totally reflecting end mirror of the laser amplifier chain or oscillator.

The wedge 22 may be comprised of crystalline quartz, or the like, while the electro-optic switch 23 may be comprised of lithium niobate, or the like. The electro-optic switch 23 also comprises a voltage source 33 which is capable of selectively applying either a zero voltage or a quarter-wave voltage to the switch 23.

Figure 2A:
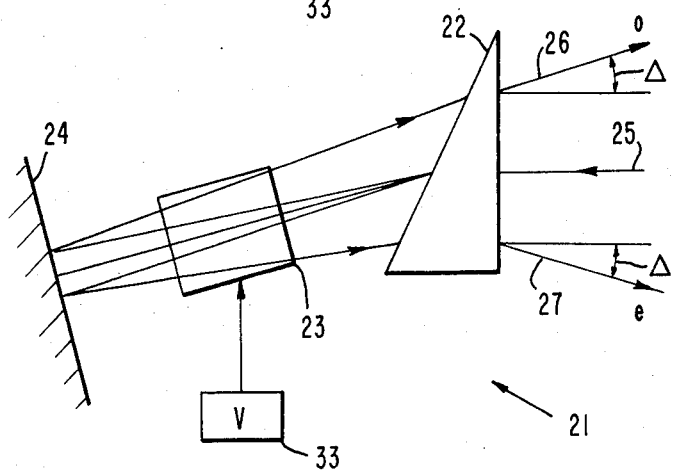
FIGS. 2a and b show the operation of the laser amplifier buffer of FIG. 1.

In operation, and referring to FIGS. 2a and b, the laser amplifier buffer 21 operates in a manner which angularly switches an incident laser beam 25 which makes a double-pass of the buffer 21. For the purpose of this discussion, it is assumed that the buffer 21 is part of a double-pass amplifier chain. For example, the incident beam 25 may be linearly polarized light. The incident laser beam 25 is made incident upon the wedge 22 from the right in FIG. 2a. Upon passing through the wedge 22, the beam 25 is separated into ordinary and extraordinary polarization components, which are orthogonal and are separated angularly. These two polarizations are shown as the e and o rays in FIGS. 1 and 2. These rays are separated by a predetermined angle indicated as $\Delta$ and which is a function of wedge angle and birefringence of the wedge 22. These two polarizations pass through the electro-optic switch 23 and are reflected from the mirror 24 and back through the switch 23 and wedge 22.

Figure 2B:
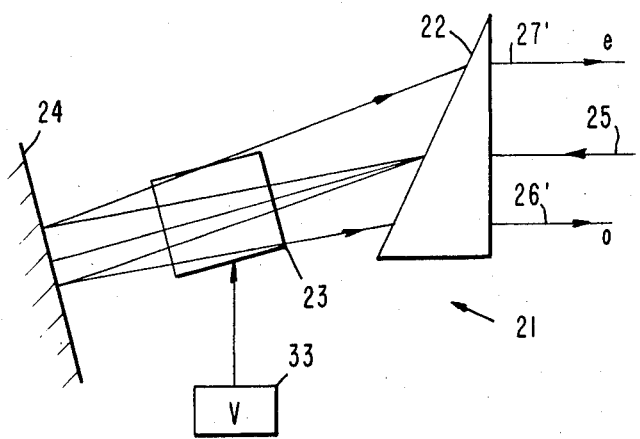

FIG. 2a shows the operation of the buffer 21 when the switch 23 is turned off. In this mode, the two orthogonally polarized rays maintain their polarization states throughout the entire pass through the buffer 21. The mirror 24 is aligned so that both rays exit the buffer 21 misaligned with the incident beam 25. FIG. 2b shows the operation of the buffer 21 when the switch 23 is turned on. Accordingly, the voltage source 33 applies a quarter-wave voltage to the switch 23. In this operational mode, the ordinary and extraordinary rays from the wedge 22 are circularly polarized during the first pass through the switch 23. The second pass back through the switch 23 causes the rays to again become linearly polarized, but with a 90° rotation of the polarization. Thus, after the second pass through the wedge 22, the ordinary ray becomes the extraordinary ray and vice-versa. The two rays are deflected by the wedge 22 so as to be parallel to each other. Therefore, the two polarization components of the beam 25 made incident upon the buffer 21 are combined to produce a linearly polarized beam as they exit the buffer 21. The polarization of the exiting beam is rotated 90° to the incident polarization.

The preceding discussion assumed that the incident beam 25 was linearly polarized. However, the incident beam 25 may also be any other polarization, or unpolarized.

Accordingly, an input beam 25 of arbitrary polarization may be made incident upon the buffer 21 from the right. Because of the birefringence of the wedge 22, the two polarizations of the incident beam 25 (ordinary and extraordinary rays) are separated by an angle $\Delta$ in the first pass through the wedge 22. The mirror 24 may be angularly adjusted so that the normal thereto bisects the two polarizations, in that the angle of incidence for the two polarizations on the mirror 24 are equal and opposite. With no voltage applied to the electro-optic switch 23, both polarizations exit the buffer 21 via rays 26, 27 misaligned with the input beam 25 by equal and opposite angles ($\Delta$). With the quarter-wave voltage applied to the switch 23, the two incident polarizations are changed by 90° during the double-pass through the electro-optic switch 23, therefore, reentering the wedge 22 with opposite polarizations. Both polarizations exit the wedge 22 via rays 26', 27' parallel with the incident beam 25, and recombine to create a beam whose initial polarization has been rotated by 90°.

The input laser beam 25 of a double-pass amplifier chain typically has a single linear horizontal or vertical polarization associated therewith. With the buffer voltage on, the input beam is returned into the amplifier with the polarization rotated 90°. This allows the output beam to be separated from the input beam by means of a polarizing switch, such as a thin film polarizer at the entrance/exit of the amplifier chain. Until the buffer voltage is switched on, both polarizations are misaligned so that the amplifier chain is prevented from superradiant lasing.

Referring to FIG. 3, there is shown a second embodiment of a laser amplifier buffer 21' in accordance with the present invention. This embodiment is substantially the same as the embodiment of FIG. 1 except that it additionally incorporates a 90° rotator 31 and a second birefringent wedge 32 along the optical path. The rotator 31 and second wedge 32 are arranged in a sandwich configuration with the birefringent wedge 22. The second wedge 32 is inverted with respect to the wedge 22. The wedge-rotator-wedge sandwich configuration is represented generally by dashed box 34. This particular embodiment may be utilized to geometrically straighten the beam path so as to align with the input beam path and to provide a wider beam deflection angle ($\Delta$).

FIGS. 4a and b show the operation of the FIG. 3 embodiment of the laser amplifier buffer 21' with FIG. 4a having the buffer 21' off and FIG. 4b having the buffer 21' on. As may be seen from FIGS. 4a and b, the incident orthogonally polarized beams exit the buffer 21' misaligned when the switch 23 is off, and aligned when the switch 23 is on.

The laser amplifier buffers 21, 21' described hereinabove may also be employed as Q-switches in a laser oscillator. The buffer may be utilized at one end of the oscillator cavity. The active gain medium is pumped while the buffer (Q-switch) is off. Since the buffer misaligns both polarized components upon transmission toward the output end mirror, the laser is prevented from lasing. When the buffer is turned on, both polarizations are aligned relative to the axis of oscillation of the oscillator, and laser radiation of both polarizations is free to oscillate between the end mirrors.

Thus, there has been described a new and improved laser amplifier buffer which may be employed in a double-pass laser amplifier chain. The buffer allows for angular switching of laser energy in order to prevent superradiant lasing with the switch off. The buffer also provides for rotation of the polarization of the laser energy to separate the amplifier output from the input with the switch on. Also, the buffer may be employed as a Q-switch in a laser oscillator.

It is to be understood that the above-described embodiments are merely illustrative of some of the many particular specific embodiments which represent applications of the principles of the present invention.

Clearly, numerous and varied other arrangements may be readily devised by those skilled in the art without departing from spirit and scope of the invention. For example, changing the mirror alignment and the electro-optic switch applied voltage permits the invention to operate as a polarized oscillator.

What is claimed is:

1. An electro-optic switch capable of operating as a laser amplifier buffer or a laser oscillator Q-switch comprising:
   a first wedge of birefringent material disposed along an optical path for receiving laser energy which is parallel to the optical axis of said switch having arbitrary polarization and angularly separating the laser energy into two orthogonal polarization components;
   an electro-optical polarization switch disposed along the optical path for transmitting the two polarization components without change when no voltage is applied thereto, said polarization switch rotating the polarization of the two polarization components by 90° for a double pass when a quarter-wave voltage is applied to said polarization switch;
   a plane mirror disposed along the optical path for reflecting the polarization components transmitted by said polarization switch back through said polarization switch, said mirror being aligned such that the normal thereto bisects the angle between the angularly separated polarization components;
   a second wedge of birefringent material disposed along said optical path between said first wedge and said electro-optic switch, said second wedge being inverted with respect to said first wedge; and
   a polarization rotator disposed along the optical path between said wedges for rotating the polarization of energy passing therethrough by 90°.

* * * * *